United States Patent [19]

Hishida et al.

[11] Patent Number: 5,426,133
[45] Date of Patent: Jun. 20, 1995

[54] WATER-ABSORPTIVE CONTACT LENS

[75] Inventors: Yasuhito Hishida; Masanori Kadoya; Keiji Sugimoto; Tsuyoshi Watanabe; Noriko Iwata, all of Nagoya, Japan

[73] Assignee: Menicon Co., Ltd., Nagoya, Japan

[21] Appl. No.: 118,648

[22] Filed: Sep. 10, 1993

[30] Foreign Application Priority Data

Sep. 22, 1992 [JP] Japan .................. 4-252561

[51] Int. Cl.$^6$ .............................................. C08L 29/00
[52] U.S. Cl. .................... 523/108; 523/106; 525/242; 525/275; 525/276; 525/279; 525/283; 525/293; 525/296; 525/297; 525/301; 525/302; 525/304; 525/311; 525/312; 525/313
[58] Field of Search ............... 525/276, 283, 293, 296, 525/297, 301, 302, 304, 311, 312, 242, 275, 279, 313; 523/106, 108

[56] References Cited

U.S. PATENT DOCUMENTS

| | | | |
|---|---|---|---|
| 4,727,097 | 2/1988 | Kobayashi et al. | 525/283 X |
| 4,745,158 | 5/1988 | Nakashima et al. | 525/283 X |
| 4,829,126 | 5/1989 | Nakajima et al. | 525/283 |
| 4,921,908 | 5/1990 | Ofstead | 525/61 |
| 4,978,713 | 12/1990 | Goldenberg | 525/61 |

FOREIGN PATENT DOCUMENTS 0279007 9/1989 European Pat. Off. .
0332179 9/1989 European Pat. Off. .

*Primary Examiner*—Judy M. Reddick
*Attorney, Agent, or Firm*—Oblon, Spivak, McClelland, Maier & Neustadt

[57] ABSTRACT

1. A water-absorptive contact lens obtained by saponification of a copolymer composed essentially of:
(A) from 1 to 30% by weight of a (meth)acrylate polymer having at least one polymerizable group per molecule on an average obtained by copolymerizing (a) an alkyl (meth)acrylate and (b) a monomer having at least two polymerizable groups per molecule, as the main components;
(B) from 1 to 10% by weight of a vinyl monomer selected from the group consisting of maleic acid esters and N-vinyl lactams;
(C) from 50 to 98% by weight of a fatty acid vinyl ester; and
(D) from 0.02 to 10% by weight of a cross linking monomer.

10 Claims, No Drawings

WATER-ABSORPTIVE CONTACT LENS

The present invention relates to a water-absorptive contact lens. More particularly, it relates to a polyvinyl alcohol-type water-absorptive contact lens which is excellent in e.g. the dimensional stability and the storage stability in a preserving solution for contact lenses.

In recent years, polyvinyl alcohols have been studied for application to medical materials, since they are excellent in water absorptivity, biocompatibility and mechanical strength. In the course of such study, it has been studied to apply polyvinyl alcohols having such excellent properties to contact lens materials. For example, it has been proposed to use as a contact lens material a polyvinyl alcohol-type polymer containing vinyl ester units (Japanese Unexamined Patent Publication No. 224628/1991). However, the contact lens made of such a polyvinyl alcohol-type polymer, is not crosslinked and thus is poor in the durability when subjected to boiling for disinfection, although it is certainly excellent in e.g. water-absorptivity. Further, when it is used over a long period of time, it is likely that crystallization of the polyvinyl alcohol chains progresses, whereby the dimension is likely to change. Furthermore, there has been a drawback that when it is immersed in a preserving solution for contact lenses containing boric acid or borax, its size changes.

Under these circumstances of the prior art, the present inventors have conducted an extensive research to obtain a water-absorptive contact lens excellent in the dimensional stability and the storage stability in a preserving solution for contact lenses. As a result, they have finally found a water-absorptive contact lens which is able to satisfy the above dimensional stability and the storage stability simultaneously. The present invention has been accomplished on the basis of this discovery.

That is, the present invention provides a water-absorptive contact lens obtained by saponification of a copolymer composed essentially of:

(A) from 1 to 30% by weight of a (meth)acrylate polymer having at least one polymerizable group per molecule on an average obtained by copolymerizing (a) an alkyl (meth)acrylate and (b) a monomer having at least two polymerizable groups per molecule, as the main components;

(B) from 1 to 10% by weight of a vinyl monomer selected from the group consisting of maleic acid esters and N-vinyl lactams;

(C) from 50 to 98% by weight of a fatty acid vinyl ester; and (D) from 0.02 to 10% by weight of a cross linking monomer.

Now, the present invention will be described in detail with reference to the preferred embodiments.

The water-absorptive contact lens of the present invention is excellent in the dimensional stability and the storage stability in a preserving solution for contact lenses.

The reason why the water-absorptive contact lens of the present invention is excellent in these properties simultaneously, is not certainly understood. However, it is conceivable that as is different from conventional contact lenses made of polyvinyl alcohol-type polymers, the stereo regularity of the polyvinyl alcohol chains constituting the water-absorptive contact lens of the present invention is disturbed by the (meth)acrylate polymer (hereinafter referred to simply as the polymer (A)) having at least one polymerizable group per molecule on an average obtained by copolymerizing (a) an alkyl (meth)acrylate monomer and (b) a monomer having at least two polymerizable groups per molecule, as the main components, and by the vinyl monomer (hereinafter referred to simply as the monomer (B)) selected from the group consisting of maleic acid esters and N-vinyl lactams, whereby crystallization is prevented from proceeding.

Further, polyvinyl alcohol molecules are chemically bonded to one another via the crosslinking monomer, whereby the water-absorptive contact lens of the present invention is excellent not only in the above-mentioned properties but also in the durability such as the mechanical strength, dimensional stability, boiling resistance and solvent resistance.

As mentioned above, the water-absorptive contact lens of the present invention is the one obtained by saponifying a copolymer composed essentially of from 1 to 30% by weight of the polymer (A), from 1 to 10% by weight of the monomer (B), from 50 to 99% by weight of a fatty acid vinyl ester (C) and from 0.02 to 10% by weight of a crosslinking monomer (D).

The polymer (A) to be used in the present invention has at least one polymerizable group per molecule on an average, and thus is efficiently copolymerizable with monomers having polymerizable groups, such as the monomer (B) and the fatty acid vinyl ester (C). Especially, when the polymer (A) has at least two polymerizable groups, the number of chemical crosslinking sites increases by the copolymerization with said monomers having polymerizable groups, whereby it is possible to obtain a water-absorptive contact lens which undergoes no macro phase-separation upon absorption of water and which has excellent transparency and durability such as mechanical strength, solvent resistance, dimensional stability and boiling resistance.

The polymer (A) is obtained by copolymerizing an alkyl (meth)acrylate (hereinafter referred to simply as a component (a)) and a monomer having at least two polymerizable groups per molecule (hereinafter referred to simply as a component (b)), as the main components.

The component (a) is an alkyl (meth)acrylate in which the alkyl group is a linear, branched or cyclic alkyl group or such an alkyl group with hydrogen atoms substituted by fluorine atoms.

Specific examples of the component (a) include methyl (meth)acrylate, ethyl (meth)acrylate, propyl (meth)acrylate, butyl (meth)acrylate, pentyl (meth)acrylate, hexyl (meth)acrylate, dodecyl (meth)acrylate, cyclohexyl (meth)acrylate, trifluoroethyl (meth)acrylate, pentafluoropropyl (meth)acrylate and hexafluoroisopropyl (meth)acrylate. These monomers may be used alone or in combination as a mixture of two or more of them.

As the component (a), it is preferred to employ e.g. a lower alkyl (meth)acrylate having from 1 to 6 carbon atoms, since it is thereby possible to conduct the copolymerization of the polymer (A) made of such a component (a) with copolymerizable monomers such as the monomer (B) and the fatty acid vinyl ester, without bringing about a steric hindrance.

Specific examples of the component (b) include monomers having at least two polymerizable groups per molecule, such as allyl (meth)acrylate, vinyl (meth)acrylate, ethylene glycol di(meth)acrylate, diethylene glycol di(meth)acrylate, triethylene glycol di(meth)acrylate and dipropylene glycol di(meth)acrylate. These monomers may be used alone or in combination as a mixture of two or more of them.

When the copolymerizability of the polymer (A) with the monomer (B) and the fatty acid vinyl ester (C) as copolymerizable monomers, is taken into consideration, it is preferred to use as the component (b) an acrylate having a vinyl-type polymerizable group such as an allyl group or a vinyl group, such as allyl (meth)acrylate or vinyl (meth)acrylate.

The molar ratio of the component (a) to the component (b) is preferably from 80/20 to 99.97/0.03, more preferably from 95/5 to 99.95/0.05. If the amount of the component (b) is less than the above lower limit, it tends to be difficult to obtain a satisfactory copolymer of the polymer (A) with the monomer (B) and the fatty acid vinyl ester (C) as copolymerizable monomers, and the product tends to be a mixture comprising the polymer (A) and a polymer composed of the monomer (B) and the fatty acid vinyl ester (C). On the other hand, if the amount exceeds the above upper limit, the crosslinking degree of the polymer (A) with the monomer (B) and the fatty acid vinyl ester (C) as copolymerizable monomers tends to be too high.

The polymer (A) comprises the above components (a) and (b) as the main components. However, it may contain as an additional component a hydrophilic monomer, for example, a hydroxyl group-containing (meth)acrylate such as hydroxyethyl (meth)acrylate or hydroxybutyl (meth)acrylate, (meth)acrylic acid, dimethyl (meth)acrylamide, or N-vinylpyrrolidone.

Further, it is preferred to adjust the sum of the components (a) and (b) to be at least 70 mol %, preferably at least 80 mol %, based on the total amount of monomer components constituting the polymer (A).

As a method to obtain the above polymer (A), a solution polymerization method may, for example, be mentioned in which the above described respective components are dissolved in a solvent, a polymerization initiator is added thereto, and polymerization is conducted at a refluxing temperature with stirring.

There is no particular restriction as to the solvent to be used for the solution polymerization method, and any solvent may be employed so long as it provides good solubility for the above-mentioned various components and it does not impair the polymerization reaction. As such a solvent, benzene or acetone may, for example, be mentioned. These solvents may be used alone or in combination as a mixture of two or more of them. The amount of the solvent varies depending upon the conditions such as the polymerization temperature and time and the types of the components to be polymerized. Accordingly, the amount may be suitably adjusted as the case requires.

As the polymerization initiator, azobisisobutylonitrile, azobisdimethylvaleronitrile, t-butylhydroperoxide, cumene hydroperoxide or benzoyl peroxide may, for example, be used. The amount of such a polymerization initiator is not critical so long as it is sufficient to initiate the polymerization. For example, it is usually from 0.01 to 5 parts by weight, preferably from 0.05 to 2 parts by weight, per 100 parts by weight of the total of the above polymer components.

The polymerization temperature and the time are inter-related and can not generally be defined. However, the polymerization time may, for example, be from a few minutes to a few hours at a relatively low temperature of e.g. from 50° to 80° C.

The number average molecular weight of the polymer (A) thus obtained is preferably from about 5,000 to 200,000, particularly from about 10,000 to 100,000, since it is influential over the mechanical strength, etc. of the desired water-absorptive contact lens. If such a number average molecular weight is too small, the mechanical strength of the water-absorptive contact lens tends to be poor. On the other hand, if the number average molecular weight is too large, the polymer (A) tends to be hardly uniformly mixed with other monomer components at the time of copolymerization, whereby it tends to be difficult to obtain a uniform water-absorptive contact lens.

The polymer (A) has at least one polymerizable group per molecule on an average and thus is well copolymerizable with monomers having polymerizable groups, such as the monomer (B) and the fatty acid vinyl ester (C), whereby reinforcing effects for the polymer (A) will be obtained.

The number of such polymerizable groups is preferably at most about five per molecule of the polymer (A). If the number of such polymerizable groups is too large, the crosslinking density of the resulting polymer at the time of copolymerization with other polymer components, tends to be too high, whereby the water absorptivity of the contact lens tends to be low, and the material tends to be brittle.

The amount of the polymer (A) is usually from 1 to 30% by weight, preferably from 3 to 20% by weight, based on the copolymer comprising the polymer (A), the monomer (B), the fatty acid vinyl ester (C) and the crosslinking monomer (D) as the main components. If the amount of the polymer (A) is less than 1% by weight, no adequate reinforcing effects tend to be obtained, and if it exceeds 30% by weight, the water absorptivity of the resulting water-absorptive contact lens tends to be low.

As mentioned above, the monomer (B) to be used in the present invention is a vinyl monomer selected from the group consisting of maleic acid esters and N-vinyl lactams. In the present invention, since such a monomer (B) is used, the anti-freezing property of the resulting water-absorptive contact lens will be improved i.e. the change in the size by freezing will be controlled, and the dimensional stability will be improved.

The above maleic acid esters may be monoesters or diesters. Specific examples of such maleic acid esters include monomethyl maleate, monoethyl maleate, monoisopropyl maleate, monobutyl maleate, monopentyl maleate, mono 2-ethylhexyl maleate, dimethyl maleate, diethyl maleate, diisopropyl maleate, dibutyl maleate, dipentyl maleate and di-2-ethylhexyl maleate.

Specific examples of the N-vinyl lactams include N-vinyl pyrrolidone, N-vinyl piperidine and N-vinyl caprolactam.

The above monomers (B) may be used alone or in combination as a mixture of two or more of them.

Among the above monomers (B), a maleic acid ester is preferred from the viewpoint of both the antifreezing property and the dimensional stability in an aqueous solution containing boric acid or borax.

The amount of the above monomer (B) is usually from 1 to 10% by weight, preferably from 2 to 5% by weight, based on the copolymer comprising the polymer (A), the monomer (B), the fatty acid vinyl ester (C) and the crosslinking monomer (D) as the main components. If the amount of the monomer (B) is less than 1% by weight, no adequate effects for improving the anti-freezing property and the dimensional stability tend to be obtained, and if it exceeds 10% by weight, the mechanical strength of the resulting water-absorptive contact lens tends to be low.

In the present invention, the fatty acid vinyl ester (C) is the main component to obtain a polyvinyl alcohol.

The above fatty acid vinyl ester (C) may be the one wherein the hydrogen atoms in the fatty acid are substituted by halogen atoms such as fluorine atoms or chlorine atoms. Specific examples of such a fatty acid vinyl ester (C) include vinyl formate, vinyl acetate, vinyl propionate, vinyl butyrate, vinyl pivalate, vinyl laurate, vinyl stearate, vinyl monochloroacetate, vinyl trifluoroacetate and vinyl trichloroacetate. These vinyl esters may be used alone or in combination as a mixture of two or more of them.

Among the above fatty acid vinyl esters (C), a lower fatty acid vinyl ester is preferred from the viewpoint of easy hydrophilic treatment by saponification. In view of the availability, vinyl acetate and vinyl trifluoroacetate are preferred.

The amount of the fatty acid vinyl ester (C) is usually from 50 to 98% by weight, preferably from 60 to 90% by weight, based on the copolymer comprising the polymer (A), the monomer (B), the fatty acid vinyl ester (C) and the crosslinking monomer (D) as the main components. If the amount of the fatty acid vinyl ester (C) is less than 50% by weight, the water absorptivity of the resulting water-absorptive contact lens tends to be low, and if it exceeds 98% by weight, the boiling resistance and the freezing resistance of the resulting water-absorptive contact lens tend to be poor.

In the present invention, the crosslinking monomer (D) is a component to improve the heat resistance so that the resulting water-absorptive contact lens can be subjected to boiling for disinfection.

As the cross linking monomer (D), there may preferably be employed, for example, a cross linking agent which (1) has a polymerizable group readily copolymerizable with other polymer components including a fatty acid vinyl ester, such as a vinyl group or an allyl group, (2) has a structure not readily hydrolyzable by saponification for hydrophilic treatment and (3) is readily soluble in and can uniformly be mixed with other polymer components including a fatty acid vinyl ester. If the cross linking monomer (D) is the one which has only a polymerizable group having poor copolymerizability, or which has a structure hydrolyzable by saponification, it is difficult to improve the physical properties such as the mechanical strength, or to minimize elution of substances from the resulting copolymer. Further, if the cross linking monomer (D) is not uniformly dissolved in the polymer components, not only a homogeneous material can not be obtained but also a transparent material can not be obtained.

The cross linking monomer (D) having such properties, includes, for example, a compound having the formula:

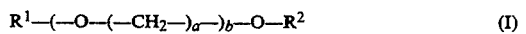

wherein each of $R^1$ and $R^2$ which may be the same or different, is $-CH=CH_2$ or $-CH_2-CH=CH_2$ and each of a and b is an integer of from 0 to 5, provided that when a is 0, b is 0 or a compound having the formula:

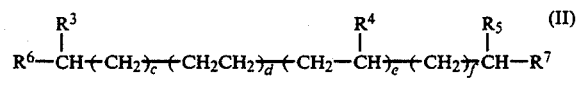

wherein each of $R^3$, $R^4$ and $R^5$ which may be the same or different, is $-CH=CH_2$ or $-CH_2-CH=CH_2$, each of $R^6$ and $R^7$ which may be the same or different, is a hydrogen atom, $-CH_3$, $-(CH_2)_g-OH$ wherein g is an integer of from 1 to 5, $-(-CH_2CH_2O)_h-R^8$ wherein $R^8$ is a hydrogen atom or $-CH_3$, h is an integer of from 0 to 12, or $-COOR^9$ wherein $R^9$ is a hydrogen atom or $-CH_3$, c is an integer of from 0 to 3, d is an integer of from 0 to 500, e is an integer of from 0 to 10,000, and f is an integer of from 0 to 3.

Specific examples of the cross linking monomer (D) having the formula I include, for example, ethylene glycol diallyl ether, ethylene glycol divinyl ether, ethylene glycol allylvinyl ether, diethylene glycol diallyl ether, diethylene glycol divinyl ether, diethylne glycol allylvinyl ether, triethylene glycol diallyl ether, triethylene glycol divinyl ether, triethylene glycol allylvinyl ether, tetraethylene glycol diallyl ether, tetraethylene glycol divinyl ether, tetraethylene glycol allylvinyl ether, pentaethylene glycol diallyl ether, pentaethylene glycol divinyl ether, pentaethylene glycol allylvinyl ether, diallyl ether, divinyl ether, allyl vinyl ether, propylene glycol diallyl ether, propylene glycol divinyl ether, propylene glycol allylvinyl ether, dipropylene glycol diallyl ether, dipropylene glycol divinyl ether, dipropylene glycol allylvinyl ether, tripropylene glycol diallyl ether, tripropylene glycol divinyl ether, tripropylene glycol allylvinyl ether, tetrapropylene glycol diallyl ether, tetrapropylene glycol divinyl ether, tetrapropylene glycol allylvinyl ether, butylene glycol diallyl ether, butylene glycol divinyl ether, butylene glycol allylvinyl ether, dibutylene glycol diallyl ether, dibutylene glycol divinyl ether, dibutylene glycol allylvinyl ether, tributylene glycol diallyl ether, tributylene glycol divinyl ether, tributylene glycol allylvinyl ether, tetrabutylene glycol diallyl ether, tetrabutylene glycol divinyl ether, and tetrabutylene glycol allylvinyl ether. Further, specific examples of the cross linking agent (C) of the formula III include, for example, NISSO-PB B series and NISSO-PB G series (which are manufactured by Nippon Soda Kabushiki Kaisha).

The amount of the above crosslinking monomer (D) is usually from 0.02 to 10% by weight, preferably from 0.1 to 5% by weight, based on the copolymer comprising the polymer (A), the monomer (B), the fatty acid vinyl ester (C) and the crosslinking monomer (D) as the main components. If the amount of the crosslinking monomer (D) is less than 0.02% by weight, the copolymer will not undergo adequate crosslinking, whereby the boiling resistance of the resulting water-absorptive contact lens tends to be poor. On the other hand, if it exceeds 10% by weight, the water absorptivity of the resulting water-absorptive contact lens tends to be low, and the elasticity tends to be poor.

As a method for preparing the above copolymer to be used for the water-absorptive contact lens of the present invention, a method may, for example, be mentioned wherein the polymer components such as the polymer (A), the monomer (B), the fatty acid vinyl ester (C) and the crosslinking monomer (D) are blended, and a polymerization initiator such as a radical polymerization initiator or a photopolymerization initiator is added thereto, followed by polymerization.

As specific examples of such a method, there may be mentioned, for example, a method wherein a radical polymerization initiator is mixed with the polymer components, the mixture is heated, for example, at a temperature of from 40° to 50° C. for from a few hours to a few tens hours for polymerization and then the temperature is gradually raised to 120° C. over a period of ten or more hours to complete the polymerization (heat polymerization), a method wherein a photo polymerization initiator is mixed with the polymer components, and then, a light having a wave length corresponding to the absorption band for activating the photo polymerization initiator (e.g. ultraviolet rays) is irradiated to the mixture (photo polymerization), or a methed wherein polymerization is conducted by a combination of the heat polymerization and the photo polymerization.

When the heat polymerization is employed, the mixture may be heated in a constant temperature bath or in a constant temperature room, or by irradiation of an electromagnetic wave such as a micro wave. The heating may be conducted stepwise. When the photo polymerization is employed, a sensitizer may further be added.

For the preparation of the copolymer in the present invention, a usual bulk polymerization method is preferably employed to obtain the material at high production efficiency. If necessary, a solution polymerization method may be employed.

Specific examples of the radical polymerization initiator include, for example, azobisisobutylonitrile, azobisdimethylvaleronitrile, benzoyl peroxide, tert-butylhydro peroxide and cumene peroxide.

Specific examples of the photo polymerization initiator include, for example, a benzoin type photo polymerization initiator such as benzoin, methyl-o-benzoyl benzoate, methyl-o-benzoyl benzoate, methylbenzoyl formate, benzoin methyl ether, benzoin ethyl ether, benzoin isopropyl ether, benzoin isobutyl ether or benzoin-n-butyl ether; a phenone type photo polymerization initiator such as 2-hydroxy-2-methyl-1-phenylpropan-1-one, p-isopropyl-α-hydroxyisobutyrophenone, p-tert-butyltrichloroacetophenone, 2,2-dimethoxy-2phenylacetophenone, α,α-dichloro-4-phenoxyacetophenone or N,N,N,N-tetraethyl-4,4-diaminobenzophenone; 1-hydroxycyclohexyl phenyl ketone; 1-phenyl-1,2-propanedione-2-(o-ethoxycarbonyl)oxime; a thioxanethone type photo polymerization initiator such as 2-chlorothioxanethone or 2-methylthioxanethone; dibenzosuberone; 2-ethylanthraquinone; benzophenone acrylate; benzophenone; and benzil.

One or more the radical polymerization initiators or photo polymerization initiators may suitably selected for use from these examples. The amount of the polymerization initiator is suitably within a range of from about 0.001 to 5 parts by weight, preferably from about 0.01 to about 2 parts by weight, relative to 100 parts by weight of the total amount of the polymer components.

For the shaping of a water-absorptive contact lens of the present invention, shaping methods commonly used by those skilled in the art may be employed. As such shaping methods, there may be mentioned, for example, a mechanical processing method such as cutting, grinding or polishing, a molding method by means of a mold and a combination of the molding method and the mechanical processing method.

The mechanical processing method is a method in which the polymer components are polymerized in a suitable mold or vessel to obtain a rod-, block- or plate-shaped polymer, and then, the mechanical processing such as cutting, grinding or polishing is applied to the polymer to shape it into a desired ocular lens.

In the molding method, a mold (casting mold) corresponding to the shape of a desired contact lens is prepared, and the polymer components are polymerized in the mold to obtain a contact lens. If necessary, the shaped contact lens thus obtained may be subjected to mechanical finishing treatment.

In the combination of the molding method and the mechanical processing method, a mold (casting mold) corresponding to at least one surface of a desired contact lens, is firstly prepared, and the polymer components are polymerized in the mold. Then, the mechanical processing is applied to form the other surface of the ocular lens to obtain a shaped product (ocular lens).

When the mechanical processing method is employed, the shaping into a contact lens is conducted prior to the below-mentioned hydrophilic treatment, since the mechanical processing can not be applied after the hydrophilic treatment.

As compared with the mechanical processing method, the molding method or the combination of the molding method and the mechanical processing method has advantages such that the starting material components may be in small amounts, the number of process steps may be small, and further, the time required for polymerization is short.

The copolymer thus obtained, is then subjected to saponification for hydrophilic treatment, to obtain a water-absorptive ocular lens.

Here, the saponification means treatment of the units derived from the maleic acid ester and the fatty acid vinyl ester (C) in the copolymer, with an alkaline or acidic compound in accordance with a conventional saponification method for a polyvinyl ester to convert the units into a carboxylic acid or an alcohol.

However, the saponification with an acidic compound is slow, and it is thereby rather difficult to obtain a homogeneous product, and it has a further drawback that the side reaction takes place. Therefore, the saponification with an alkaline compound is preferred.

The alkaline compound useful for the saponification is a hydroxide of ammonia, an alkali metal or an alkaline earth metal. Specific examples of such an alkaline compound include ammonium hydroxide, sodium hydroxide, potassium hydroxide and calcium hydroxide. These alkaline compounds are usually solid. Therefore, they may be usually dissolved in alcohols or ethers so that they are used for the saponification reaction in the form of alkaline solutions.

The alcohols include methanol, ethanol, propyl alcohol and butyl alcohol. The ethers include diethyl ether and tetrahydrofuran.

Among the alkaline solutions of alkaline compounds useful for saponification, those employing alcohols are preferred. Among them, a 0.1–1.0N alkali alcohol solution is particularly preferred. To let the saponification treatment proceed efficiently, it is possible to use a mixture of the alkali alcohol solution and the aqueous alkaline solution.

The saponification is conducted by immersing the above-mentioned copolymer in the alkaline solution.

The reaction temperature for the saponification is usually within a range of from 0° to 100° C., preferably from 10° to 70° C. The reaction time for the saponification varies depending upon the type of the alkaline compound, the concentration of the alkaline compound and the reaction temperature for the saponification, and therefore can not generally be defined. For the practical operation, however, if the saponification reaction can not be completed at room temperature in a few hours, it is preferred to warm up the solution for the saponification treatment. Further, the saponification reaction can be conducted in the heterogeneous system.

Here, it is desirable that the saponification degree of the units derived from the maleic acid ester and the fatty acid vinyl ester (C) as the saponifiable units in the copolymer, is at least 90 mol %, preferably at least 93 mol %. If such a saponification degree is less than 90 mol %, the desired water absorptivity tends to be hardly attained, or the resulting water-absorptive contact lens tends to be inferior in the long term stability such that the water-absorptivity changes by repeated operation of e.g. boiling treatment during the use for a long period of time, whereby the size is likely to change.

The copolymer thus saponified, is then subjected to boiling treatment in a saline for a few hours to obtain a swelled water-absorptive contact lens which is safe to living bodies.

Now, the water-absorptive contact lens of the present invention will be described in further detail with reference to Examples. However, it should be understood that the present invention is by no means restricted to such specific Examples.

REFERENCE EXAMPLE 1

Preparation of a (meth)acrylate polymer having at least one polymerizable group per molecule on an average [polymethyl methacrylate (polymer (A))]

Into a three-necked round bottom flask, 99 g of methyl methacrylate, 1 g of allyl methacrylate, 0.5 g of azobisisobutyronitrile as a polymerization initiator and 720 ml of benzene as a solvent, were added and polymerized with stirring at a refluxing temperature for 2 hours. Then, the polymerization solution thus obtained was poured into n-hexane, and the copolymer precipitated was collected and dried under reduced pressure. The copolymer was dissolved in benzene, and then poured into a large amount of n-hexane, whereby it was again precipitated for purification. The precipitates were collected and dried under reduced pressure to obtain polymethyl methacrylate (hereinafter referred to as PMMA).

The number average molecular weight and the average number of polymerizable groups per molecule of PMMA thus obtained, were measured in accordance with the following methods. As a result, the number average molecular weight was 23,000, and the average number of polymerizable groups per molecule was 1.8.
Number average molecular weight:
Measured by gel permeation chromatography.
Average number of polymerizable groups per molecule:
Measured by gel permeation chromatography and Fourier's conversion proton nuclear magnetic resonance spectroscopy.

EXAMPLE 1

Into a 100 ml Erlenmeyer flask, 10 parts by weight of PMMA obtained in Reference Example 1 was charged, and 0.5 part by weight of diethylene glycol diallyl ether (crosslinking monomer (D)), 2.7 parts by weight of dimethyl maleate (monomer (B)) and 80 parts by weight of vinyl acetate (fatty acid vinyl ester (C)) were added thereto and completely dissolved to bring the composition as shown in Table 1. Then, 0.1 part by weight of azobisdimethylvaleronitrile as a polymerization initiator was added thereto and dissolved. The solution was transferred to a glass test tube having an inner diameter of 14 mm.

Then, a polyethylene stopper was placed on the test tube, and the polymerization was conducted in a constant temperature bath at 35° C. for 40 hours. Then, the temperature was raised to 50° C., and the polymerization was conducted for 8 hours. The product was transferred to an air circulating oven. Here, the product was heated at 50° C. for 5 hours, and then heated for 9 hours while gradually raising the temperature from 60° C. to 110° C., to complete the polymerization. The product was cooled to room temperature and then heated at 90° C. for 2 hours to remove a distortion.

10 sheets of a film having a thickness of 0.14 mm and a diameter of 12 mm and 5 sheets of a plate having a thickness of 0.5 mm and a diameter of 12 mm were prepared by cutting the rod-shaped material thereby obtained, and they were used as test specimens.

Then, into a Petri dish having a diameter of about 10 cm, about 50 ml of a methanol aqueous solution of 0.25N sodium hydroxide (volume ratio of methanol/water=4/1) was introduced. The above test specimens were immersed therein and left to stand at room temperature for 24 hours to complete saponification. After washing them with water, the test specimens and 500 ml of water were introduced to a 1 l Erlenmeyer flask, and boiled for 24 hours. After cooling, 500 ml of water was replaced by 500 ml of a saline.

The saponification degree of the test specimens was measured in accordance with the following method. The results are shown in Table 1.
Saponification degree The saponification degree (mol %) was calculated from the $^{13}$C-NMR spectrum attributable to the maleic acid ester and the vinyl acetate. The conditions for measuring the NMR spectrum are shown below.
Measuring apparatus: XL-200FT-NMR spectrometer, manufactured by Barian
Measuring nucleus: $^{13}$C (50.3 MHz)
Measuring temperature: 60° C.
Sample: 3 to 5 sheets of test specimen swelled with distilled water to the equilibrium state having a thickness of about 1 mm (thickness after cutting: 0.5 mm) were put into a NMR test tube together with the distilled water.

With respect to the test specimens after completion of the saponification and elution treatment, various physical properties were measured in accordance with the following methods. The results are shown in Table 1.
Water content:

The water content of a test specimen (thickness after cutting: 0.5 mm) was determined in accordance with the following equation.

Water content (%)=$(W-W_0)/W \times 100$ where W is the weight (g) of the test specimen upon absorption of water to the equilibrium state, and $W_0$ is the weight (g) of the test specimen in a dried state.
Transparency A test specimen was visually inspected.
Evaluation standard
A: Transparent B: Slight turbidity observed
C: Substantial turbidity observed Penetration resistance:

By means of an Instron type compression tester, a pressing needle having a diameter of 1/16 inch was pressed against the center of the test specimen having a thickness of about 0.2 mm upon absorption of water to the equilibrium state (thickness after cutting: 0.14 mm), and the load (g) at the time of the breakage of the test specimen was measured.

Elongation:

The elongation (%) at the time of the breakage of the test specimen in the above-mentioned measurement of the penetration resistance (g), was measured.

Strength index:

The mechanical strength of the material depends on both the elongation (%) and the penetration resistance (g). Therefore, as an index for relative strength, the strength index was calculated in accordance with the following equation.

$$\text{Strength index} = \frac{\text{Penetration resistance (g)} \times \text{Elongation (\%)}}{2 \times \text{Film thickness (} \mu\text{m)}}$$

Antifreezing property

The freezing conditions were such that a specimen was left to stand at −5° C. for 24 hours, and the thawing conditions were such that the specimen was left to stand at 20° C. for 24 hours. Under these conditions, the freezing-thawing treatment of a test specimen swelled with water to the equilibrium state having a thickness of about 0.2 mm (thickness after cutting: 0.14 mm) was repeated five times, and the dimensional change of the test specimen after this treatment was calculated in accordance with the following equation.

Dimensional change (%)=(Z2 −Z1)Z1×100 where Z1 is the size (mm) of the test specimen before the treatment, and Z2 is the size (mm) of the test specimen after the treatment.

Further, the change of the appearance was visually observed and evaluated in accordance with the following evaluation standards.

Evaluation standards
A: No change
B: Slight turbidity observed
C: Substantial turbidity observed The size change in an aqueous boric acid solution Size A1 (mm) of a test specimen swelled with a saline to the equilibrium state at 20° C. and size A2 (mm) of the test specimen immersed in a 0.5% boric acid aqueous solution having the same tension as the sodium chloride aqueous solution for 24 hours, were measured, and the size change was obtained in accordance with the following equation:

$$\text{Size change (\%)} = (A2 - A1)/A1 \times 100$$

EXAMPLES 2 TO 5 AND COMPARATIVE EXAMPLE 1

Test specimens were prepared and saponification and elution treatments were applied thereto in the same manner as in Example 1 except that the composition was changed as shown in Table 1. With respect to such test specimens, various physical properties were measured in the same manner as in Example 1. The results are shown in Table 1.

TABLE 1

| | | Example No. | | | | | Comparative Example 1 |
| --- | --- | --- | --- | --- | --- | --- | --- |
| | | 1 | 2 | 3 | 4 | 5 | |
| Composition (parts by weight) | PMMA | 10 | 10 | 10 | 5 | 10 | 5 |
| | Dimethyl maleate | 2.7 | — | — | — | — | — |
| | Diethyl maleate | — | 3.3 | — | — | — | — |
| | Di-n-butyl maleate | — | — | 4.2 | — | — | — |
| | Di-t-butyl maleate | — | — | — | .43 | — | — |
| | N-vinyl pyrrolidone | — | — | — | — | 2.1 | — |
| | Vinyl acetate | 80 | 80 | 80 | 80 | 80 | 95 |
| | Diethylene glycol diallyl ether | 0.5 | 0.5 | 0.5 | 0.5 | 0.3 | 0.5 |
| | Azobisdimethyl valeronitrile | 0.1 | 0.1 | 0.1 | 0.1 | 0.1 | 0.1 |
| | Saponification | ≧93 | ≧93 | ≧93 | ≧93 | ≧93 | ≧93 |
| Physical properties | Water content (wt %) | 80 | 77 | 79 | 83 | 75 | 79 |
| | Transparency | A | A | A | A | A | A |
| | Penetration resistance (g) | 145 | 330 | 250 | 170 | 330 | 380 |
| | Elongation (%) | 75 | 150 | 110 | 140 | 170 | 250 |
| | Strength index (g · %/μm) | 30 | 130 | 70 | 60 | 140 | 240 |
| | Freezing resistance | | | | | | |
| | . Dimensional change (%) | −1.3 | −0.8 | −1.3 | −0.8 | −0.8 | −7.2 |
| | . Change of appearance | A | A | A | A | A | B |
| | Size change in an aqueous boric acid solution (%) | −1 | −1 | −1 | −1 | −3 | −8 |

From the results shown in Table 1, it is evident that each of the test specimens obtained in Examples 1 to 5 had a small dimensional change after freezing treatment and a small size change in the aqueous boric acid solution, as compared with the one obtained in Comparative Example 1.

The water-absorptive contact lens of the present invention undergoes no substantial dimensional change (contraction) even when used for a long period of time and undergoes no substantial size change even when immersed in a preserving solution for contact lenses which contains e.g. boric acid or borax. Thus, it provides an effect that it is excellent in e.g. the storage stability in a preserving solution for contact lenses.

We claim:

1. A water-absorptive contact lens obtained by saponification of a copolymer consisting essentially of:
    (A) from 1 to 30% by weight of a (meth)acrylate polymer having an average of at least one polymerizable group per molecule obtained by copolymerizing (a) an alkyl (meth)acrylate and (b) a monomer having at least two polymerizable groups per molecule, as the main components;

(B) from 1 to 10% by weight of a vinyl monomer of maleic acid esters, or a combination of maleic acid esters and N-vinyl lactams;

(C) from 50 to 98% by weight of a vinyl ester selected from the group consisting of vinyl formate, vinyl acetate, vinyl propionate, vinyl butyrate, vinyl pivalate, vinyl laurate, vinyl stearate, vinyl monochloroacetate, vinyl trifluoroacetate and vinyl trichloroacetate; and (D) from 0.02 to 10% by weight of a cross linking monomer;

wherein said vinyl monomer (B) is at least one member selected from the group consisting of monomethyl maleate, monoethyl maleate, monoisopropyl maleate, monobutyl maleate, monopentyl maleate, mono 2-ethylhexyl maleate, dimethyl maleate, diethyl maleate, diisopropyl maleate, dibutyl maleate, dipentyl maleate, di-2-ethylhexyl maleate, N-vinyl pyrrolidone, N-vinyl piperidine and N-vinyl caprolactam.

2. The water-absorptive contact lens according to claim 1, wherein the crosslinking monomer (D) is a compound of the formula:

  (I)

wherein each of $R^1$ and $R^2$ which may be the same or different, is $-CH=CH_2$ or $-CH_2-CH=CH_2$, and each of a and b is an integer of from 0 to 5, provided that when a is 0, b is 0; or the formula:

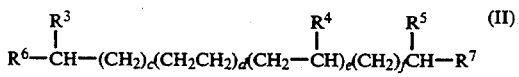  (II)

wherein each of $R^3$, $R^4$ and $R^5$ which may be the same or different, is $-CH=CH_2$ or $-CH_2-CH=CH_2$, each of $R^6$ and $R^7$ which may be the same or different, is a hydrogen atom, $-CH_3$, $-(CH_2)_g-OH$ wherein g is an integer of from 1 to 5, $-(CH_2CH_2O-)_h-R^8$ wherein $R^8$ is a hydrogen atom or $-CH_3$, and h is an integer of from 0 to 12, or $-COOR^9$ wherein $R^9$ is a hydrogen atom or $-CH_3$, c is an integer of from 0 to 3, d is an integer of from 0 to 500, e is an integer of from 1 to 10,000, and f is an integer of from 0 to 3.

3. The water-absorptive contact lens according to claim 1, wherein the alkyl (meth)acrylate of component (a) is at least one member selected from the group consisting of methyl (meth)acrylate, ethyl (meth)acrylate, propyl (meth)acrylate, butyl (meth)acrylate, pentyl (meth)acrylate, hexyl (meth)acrylate, dodecyl (meth)acrylate, cyclohexyl (meth)acrylate, trifluoroethyl (meth)acrylate, pentafluoropropyl (meth)acrylate and hexafluoroisopropyl (meth)acrylate.

4. The water-absorptive contact lens according to claim 1, wherein the monomer of component (b) is at least one member selected from the group consisting of allyl (meth)acrylate, vinyl (meth)acrylate, ethylene glycol di(meth)acrylate, diethylene glycol di(meth)acrylate, triethylene glycol di(meth)acrylate and dipropylene glycol di(meth)acrylate.

5. The water-absorptive contact lens according to claim 1, wherein the (meth)acrylate polymer (A) has (c) a hydrophilic monomer copolymerized with the components (a) and (b).

6. The water-absorptive contact lens according to claim 5, wherein the hydrophilic monomer of component (c) is selected from the group consisting of a hydroxyl group-containing (meth)acrylate, (meth)acrylic acid, dimethyl (meth)acrylamide and N-vinyl pyrrolidone.

7. The water-absorptive contact lens according to claim 1, wherein the molar ratio of the component (a) to the (b) in the (meth)acrylate polymer (A) is from 80/20 to 99.97/0.03, and the sum of the components (a) and (b) is at least 70 mol % based on the total amount of monomers constituting the (meth)acrylate polymer (A).

8. The water-absorptive contact lens according to claim 1, wherein the (meth)acrylate polymer (A) has a number average molecular weight of from about 5,000 to about 200,000.

9. The water-absorptive contact lens according to claim 1, wherein the (meth)acrylate polymer (A) has a number average molecular weight of from 10,000 to 100,000 and contains an average of from 1 to 5 polymerizable groups per molecule.

10. A water-absorptive contact lens obtained by saponification of a copolymer consisting essentially of:

(A) from 1 to 30% by weight of a (meth)acrylate polymer having an average of at least one polymerizable group per molecule, obtained by copolymerizing (a) an alkyl-(meth)acrylate and (b) a monomer having at least two polymerizable groups per molecule, as the main components;

(B) from 1 to 10% by weight of a vinyl monomer selected from the group consisting of monomethyl maleate, monoethyl maleate, monoisopropyl maleate, monobutyl maleate, monopentyl maleate, mono-2-ethylhexyl maleate, dimethyl maleate, diethyl maleate, diisopropyl maleate, dibutyl maleate, dipentyl maleate and di-2-ethylhexyl maleate;

(C) from 50 to 98% by weight of a vinyl ester selected from the group consisting of vinyl formate, vinyl acetate, vinyl propionate, vinyl butyrate, vinyl pivalate, vinyl laurate, vinyl stearate, vinyl monochloroacetate, vinyl trifluoroacetate and vinyl trichloroacetate; and (D) from 0.02 to 10% by weight of a crosslinking monomer.

* * * * *